United States Patent [19]

Humphreys et al.

[11] 4,294,658
[45] Oct. 13, 1981

[54] NUCLEAR REACTORS

[75] Inventors: Peter Humphreys, Warrington; Daniel F. Davidson, Altrincham; Gordon Thatcher, Lymm, all of England

[73] Assignee: United Kingdom Atomic Energy Authority, London, England

[21] Appl. No.: 76,943

[22] Filed: Sep. 19, 1979

[30] Foreign Application Priority Data

Oct. 9, 1978 [GB] United Kingdom ............... 39814/78

[51] Int. Cl.³ .................... G21C 9/00; G21C 15/18
[52] U.S. Cl. ................................. 376/404; 376/171
[58] Field of Search ............... 176/38, 65, 86 M

[56] References Cited

U.S. PATENT DOCUMENTS 3,715,270 2/1973 Jackson .................................. 176/38
3,773,619 11/1973 Harrington et al. ............. 176/86 M

FOREIGN PATENT DOCUMENTS 745460 2/1956 United Kingdom ............. 176/86 M

Primary Examiner—Harvey E. Behrend
Attorney, Agent, or Firm—William R. Hinds

[57] ABSTRACT

A liquid metal cooled fast breeder nuclear reactor of the pool kind has an intermediate heat exchange module comprising a tube-in-shell heat exchanger and an electromagnetic flow coupler in the base region of the module. Primary coolant is flowed through the heat exchanger being driven by electromagnetic interaction with secondary liquid metal coolant flow effected by a mechanical pump.

3 Claims, 6 Drawing Figures

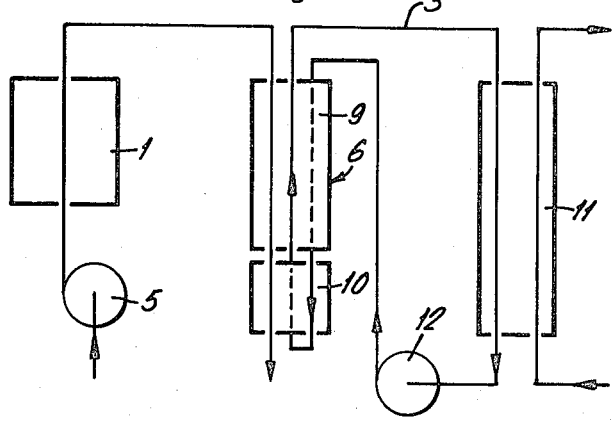
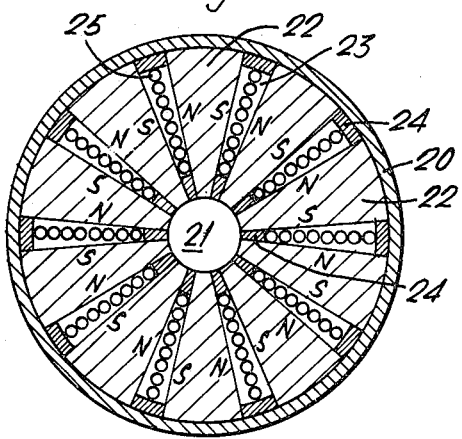
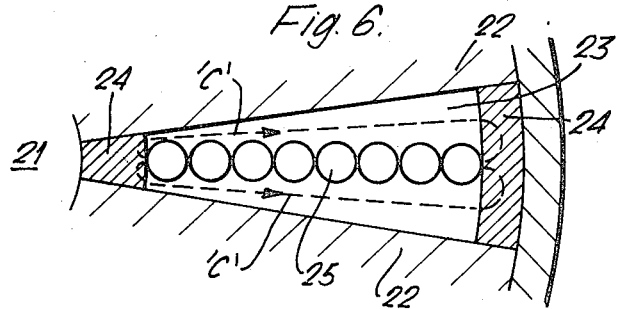

NUCLEAR REACTORS

BACKGROUND OF THE INVENTION

This invention relates to liquid metal cooled nuclear reactors of the pool kind.

In a liquid metal cooled nuclear reactor of the pool kind the fuel assembly is submerged in a pool of primary liquid metal coolant contained in a vessel housed in a concrete vault. The coolant system comprises a plurality of intermediate heat exchangers whereby heat exchange is effected between the primary coolant flowing through the fuel assembly and a secondary coolant which flows in heat exchange with water to raise steam and a plurality of coolant pumps which are carried by the roof of the vault and immersed in the pool of coolant. The heat exchangers are within a core tank surrounding the fuel assembly and the pumps are disposed outside the core tank. In operation of the nuclear reactor, primary coolant is drawn from the pool by the pumps and passed upwardly through the fuel assembly to the intermediate heat exchangers, the coolant then flows downwardly back to the pool through the tubes of the heat exchangers. Primary coolant flow through the intermediate heat exchangers is effected by a pressure head of coolant contained within the core tank and generated by the coolant pumps. There are several problems with a coolant system of this kind, in particular, the problem of severe thermal shock occasioned to an intermediate heat exchanger when there is an interruption in the flow of coolant in the relevant secondary coolant circuit, for example, as caused by a failure of the secondary coolant pump. During the transient, the primary intermediate heat exchanger inlet temperature front travels down the tube bundles of the heat exchanger and most of the heat transfer occurs in the region of a secondary inlet window at the base of the intermediate heat exchanger. The lower tube plate is therefore subjected to a temperature differential of about 200° C. which produces high stress concentrations in the region of the secondary inlet window.

An object of the invention is to reduce the thermal shock occasioned to the intermediate heat exchanger of a liquid metal cooled nuclear reactor of the pool kind in such an emergency wherein there is an interruption in flow in the secondary coolant circuit.

SUMMARY OF THE INVENTION

According to the invention in a liquid metal cooled nuclear reactor of the pool kind, there is an intermediate heat exchange module comprising a tube-in-shell intermediate heat exchanger and an electromagnetic flow coupler disposed in the base region of the module for driving primary coolant through the heat exchanger, the electromagnetic flow coupler being associated with a secondary coolant circuit from which the driving effort for the primary coolant is derived. An electromagnetic flow coupler is a device whereby hydraulic power is transferred between two isolated liquid metal circuits by the intermediary of electrical energy. In operation of a nuclear reactor according to the invention, during a transient in the secondary coolant flow through the intermediate heat exchanger the primary flow will, in general, follow the change in secondary flow so that complete loss of flow of a secondary circuit will cause, substantially, the cessation of primary flow thereby substantially terminating the temperature transient before it reaches the lower tube plate of the intermediate heat exchanger.

DESCRIPTION OF THE DRAWINGS

A construction of liquid metal cooled nuclear reactor of the pool kind embodying the invention is described, by way of example, with reference to the accompanying drawings wherein:

FIG. 2 is a line diagram showing the relationship of primary and secondary coolant circuits;

FIG. 4 is a diagrammatic cross-section of the electromagnetic flow coupler, FIG. 6 is a diagrammatic plan view of a detail of the electromagnetic flow coupler.

DESCRIPTION OF THE PREFERRED EMBODIMENT

Figure 1:
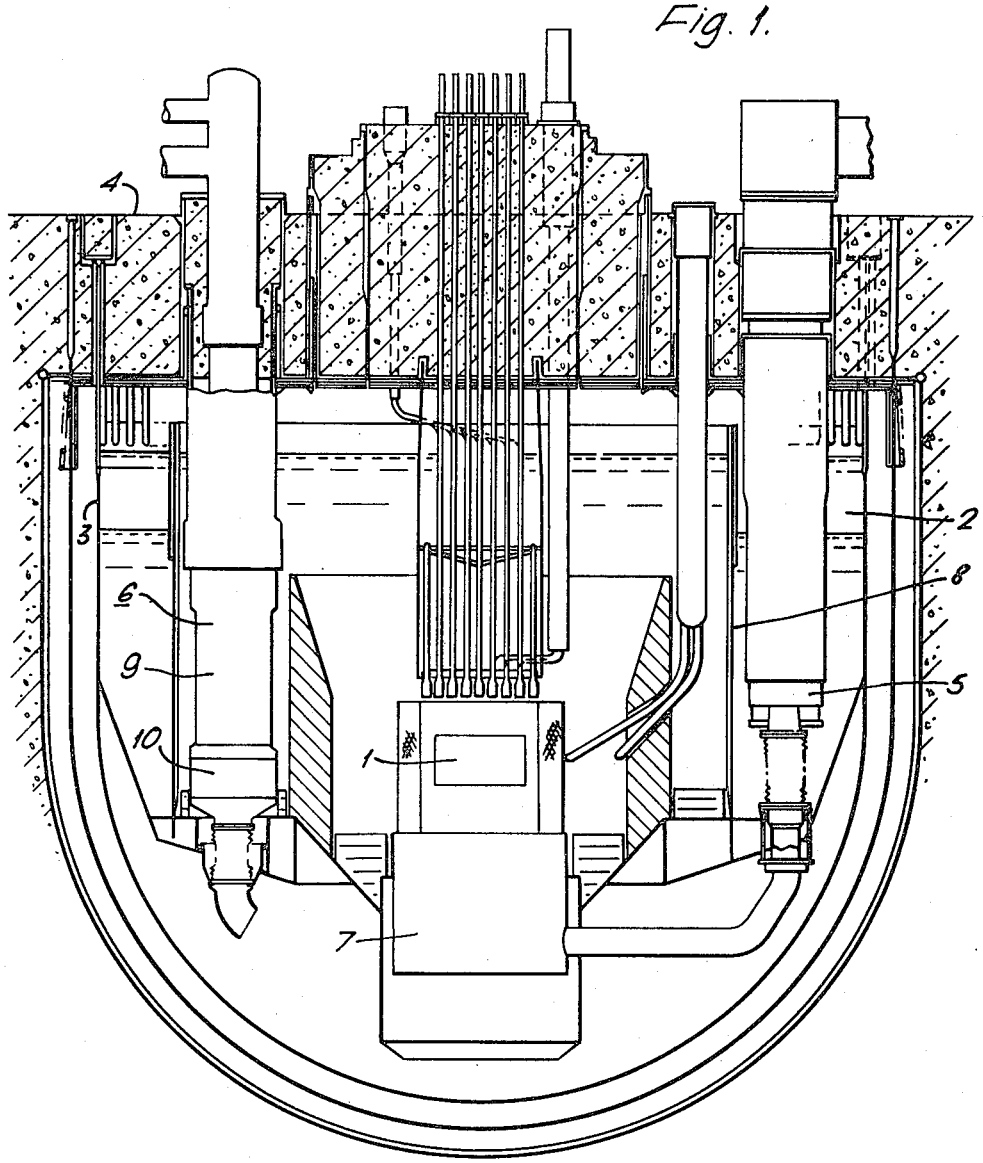
FIG. 1 is a sectional view.

FIG. 1 illustrates a liquid metal cooled fast breeder nuclear reactor having a fuel assembly 1 submerged in a pool 2 of liquid sodium in a primary vessel 3. The primary vessel is suspended from the roof of a containment vault 4 and there is provided a plurality of coolant pumps 5 and intermediate heat exchange modules 6, one only of the pumps and intermediate heat exchange modules being shown. The fuel assembly 1 mounted on a diagrid 7 is housed with the heat exchangers in a core tank 8 whilst the pumps 5, which deliver coolant to the diagrid, are disposed outside of the core tank. The intermediate heat exchange modules each comprise a tube-in-shell intermediate heat exchanger 9 and an electromagnetic flow coupler 10 disposed in the base of the module. There is a secondary coolant circuit associated with each intermediate heat exchange module each secondary coolant circuit, designated S in FIG. 2, being closed and including a steam generator 11, a secondary coolant pump 12 and the intermediate heat exchange module 6.

In operation of the nuclear reactor, primary liquid sodium at approximately 400° C. is drawn from the pool 2 by the pumps 5 and passed upwardly through the fuel assembly by way of the diagrid 7. In passage through the fuel assembly, the coolant is heated to approximately 600° C. and it flows from above the fuel assembly within the core tank 8 through an inlet port in the module 6 downwardly through the tubes of the tube-in-shell heat exchanger 9 thence through the electromagnetic flow coupler 10 back into the pool. Secondary liquid sodium coolant is flowed through the flow coupler 10 thence through the shell of the heat exchanger 9 in heat exchanger with the primary coolant and then through the steam generator 11, in heat exchange with feedwater. The generated steam is subsequently dried and superheated, then passed to a steam turbine (not shown), for the generation of electrical energy. In passage through the flow coupler 10 the secondary coolant interacts electromagnetically to drive the primary coolant through the tubes of the intermediate heat exchanger.

Figure 3:
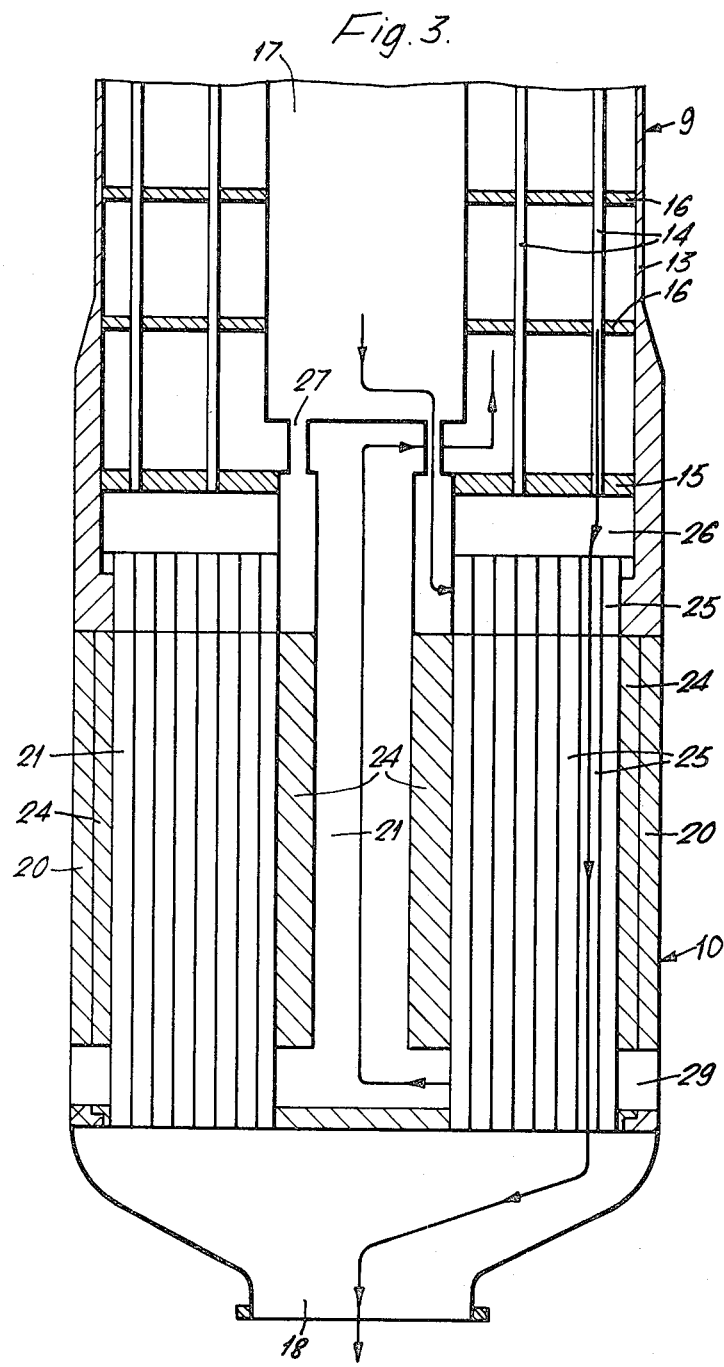
FIG. 3 is a diagrammatic sectional view of an intermediate heat exchange module including an electromagnetic flow coupler.

A section through the intermediate heat exchange module is shown diagrammatically in FIG. 3. The shell of the tube-in-shell heat exchanger, the heat exchange tubes (only four being shown), the lower tube plate and intermediate grid plates are designated 13, 14, 15 and 16 respectively and a central duct is designated 17. The lower end of the shell is extended by the flow coupler 10 and provides an outlet port 18 for primary coolant.

An electromagnetic flow coupler is a device comprising at least a pair of parallel ducts for liquid metal and a magnet system for creating a transverse magnetic field through both ducts. The arrangement is such that liquid metal flow through one duct generates an EMF which, when applied to the other duct to generate a current through the liquid metal in the other duct, causes liquid metal flow in said other duct, both the generation of the EMF and the pumping action being based on the Faraday principle. In this way the applied flow in one duct is coupled to the generated flow in the other duct. An example of electromagnetic flow coupler is disclosed in U.S. Pat. No. 3,773,619.

Figure 5:
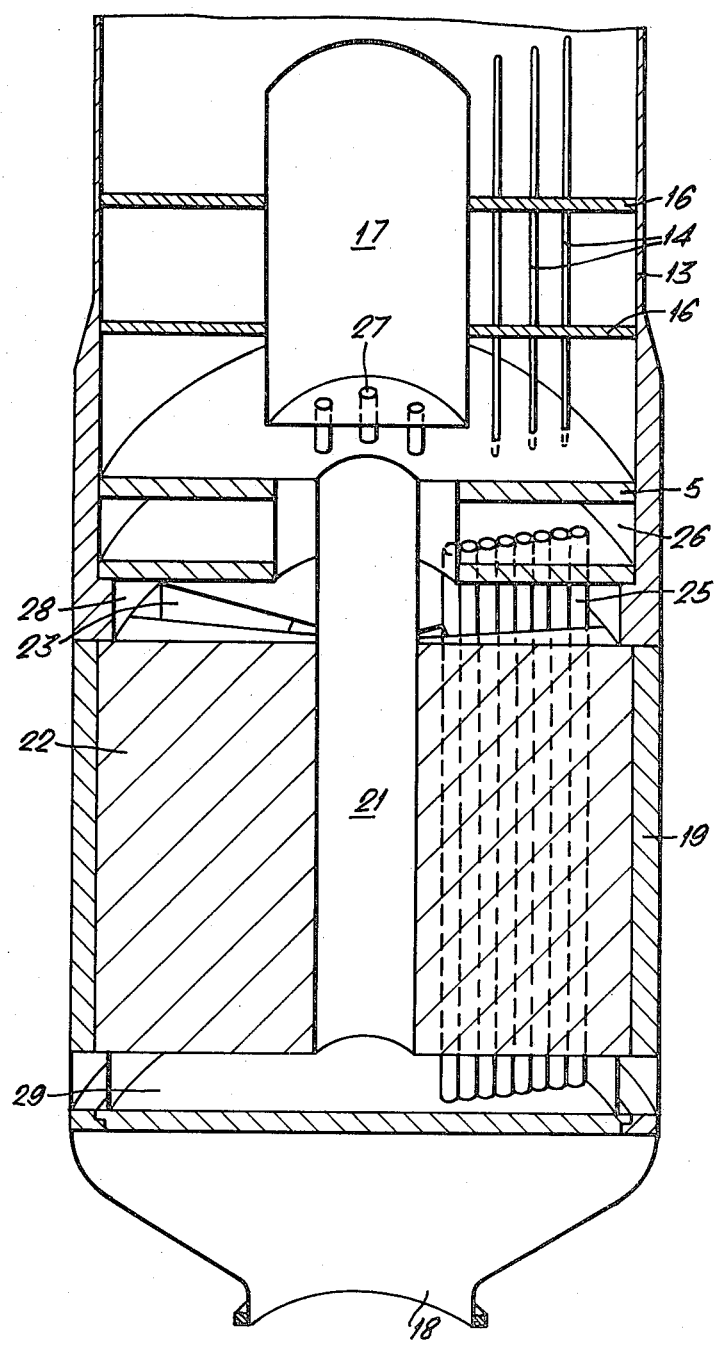
FIG. 5 is a diagrammatic perspective view in section of the intermediate heat exchange module.

The electromagnetic flow coupler of the presently described intermediate heat exchange module is shown most explicitly in FIG. 4. A cylindrical shell 20 of stainless steel has a central duct 21 to define an annulus which contains ten equally spaced permanent magnets 22 of generally sectoral shape. The spaces therebetween define ducts 23 for liquid metal flow and have copper inserts at the opposed end walls of the generally sectoral ducts to form electrical connections along the end walls of the ducts. The ducts 23 are lined with thin stainless steel to contain the pressure of the sodium and to isolate the magnets and copper inserts from the sodium. In an alternative construction the electrical connections are constituted by thick end walls of the ducts 23 instead of copper inserts. To reduce losses due to current paths in the magnets, the outer sides of the stainless steel linings of the ducts 23 are clad with electrical insulation (not shown in the drawings). There is a linear series of eight tubes 25 for conducting primary liquid metal coolant extending within and parallel to each duct 23 the tubes of each linear series being contiguous so as to provide electrical conductors extending transversely to the ducts 23. Referring now to FIG. 5, the open upper ends of the tubes 25 communicate with a plenum 26 at the underside of the lower tube plate 15 of the heat exchanger, so that primary coolant flow through the heat exchanger tubes can continue to flow through the tubes 25 to the outlet port 18. The central duct 17 of the heat exchanger communicates with the ducts 23 through passages 27 and a second plenum 28 so that secondary coolant driven by the secondary pump 12 flowing downwardly in the central duct 17 can flow through the ducts 23 to a lower third plenum 29, thence upwardly through the central duct 21 of the flow coupler and through the shell of the heat exchanger in heat exchange with the primary coolant flowing through the heat exchange tubes 14. The secondary liquid metal coolant flowing downwardly through the ducts 23 interacts with the magnetic field to generate a voltage potential between the opposed end walls of the sectoral ducts causing electric currents 'C' to flow transversely to the ducts 23 through the liquid metal and across the primary coolant conducting tubes 25 by way of the copper inserts 24. The interaction between the applied magnetic field and the current flow across the tubes 25 produces a pressure differential along the tube 25 to drive the primary coolant downwardly. Thus if the secondary pump 12 fails the driving flow through the electromagnetic flow coupler is interrupted and the driving head for the primary coolant flow through the intermediate heat exchanger is lost so that any temperature transient reaching the lower tube plate of the heat exchanger is reduced to almost negligible proportions.

Although the principal advantage stemming from the invention is the reduction of thermal shock occasioned to the lower tube plate when the secondary coolant flow is interrupted, several other significant advantages also accrue. Since the driving force for the primary coolant flow through the intermediate heat exchanger is achieved electromagnetically, the pressure head normally provided in the core tank is not required so that the primary coolant pumps can be of lower capacity and the primary vessel and vault can be reduced in height, thereby achieving a significant reduction in capital cost. Furthermore, the problem created by the temperature differential across the wall of the upper region of the core tank which in conventional constructions contains the pressure head is alleviated by dispensing with the pressure head. The thermal transient seen by the intermediate heat exchanger during start-up is reduced because the flow rate of the primary coolant will increase at proportionally the same rate as the secondary flow.

We claim:

1. A liquid metal cooled nuclear reactor comprising:
    a primary vessel;
    a fuel assembly submerged in a pool of primary liquid metal coolant within the primary vessel;
    a concrete vault housing said primary vessel;
    at least one heat exchange module carried by a roof of the vault and immersed in the pool of coolant, and
    a pump for circulating primary coolant from the pool through the fuel assembly to the heat exchange module, the heat exchange module comprising a tube-in-shell heat exchanger and an electromagnetic flow coupler disposed in the base region of the module for driving primary coolant through the heat exchanger, the electromagnetic flow coupler being associated with a secondary coolant circuit from which the driving effort for the primary coolant is derived.

2. A nuclear reactor according to claim 1 wherein the electromagnetic flow coupler of the heat exchange module comprises a plurality of spaced ducts for a first coolant flow, a linear series of tubes extending within and parallel to each duct for conducting a second coolant flow, the tubes of each linear series being connected to form electrical conductors extending transverse to the ducts and a plurality of permanent magnets interposed between the ducts to create magnetic fields transverse to the ducts and normal to the conductors formed by the linear series of tubes.

3. A nuclear reactor according to claim 2 wherein the ducts of the electromagnetic flow coupler are disposed to receive and conduct secondary coolant flow and the tubes are disposed to receive and conduct primary coolant flow.

* * * * *